US006959190B2

(12) United States Patent
Choi et al.

(10) Patent No.: US 6,959,190 B2
(45) Date of Patent: Oct. 25, 2005

(54) METHOD FOR PERFORMING A FAST INTRA-PDSN SOFT HANDOFF

(75) Inventors: Sang-Ho Choi, Taejon (KR); Kyung-Sik Kim, Taejon (KR); Dong-Jin Shin, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 468 days.

(21) Appl. No.: 10/026,620

(22) Filed: Dec. 27, 2001

(65) Prior Publication Data

US 2003/0054823 A1 Mar. 20, 2003

(30) Foreign Application Priority Data

Sep. 14, 2001 (KR) .............................. 2001-56710

(51) Int. Cl.[7] .......................... H04Q 7/20; H04L 12/66
(52) U.S. Cl. ..................... 455/442; 455/439; 370/331; 370/354
(58) Field of Search ............................. 455/436, 442, 455/438, 439, 440, 450; 370/331, 329, 352, 370/354, 355, 356

(56) References Cited

U.S. PATENT DOCUMENTS

| 5,930,714 | A  | * | 7/1999  | Abu-Amara et al. | 455/442 |
| 6,519,457 | B1 | * | 2/2003  | Jiang et al. | 455/442 |
| 6,580,699 | B1 | * | 6/2003  | Manning et al. | 370/331 |
| 6,731,948 | B1 | * | 5/2004  | Lee et al. | 455/522 |
| 6,834,050 | B1 | * | 12/2004 | Madour et al. | 370/331 |
| 6,834,190 | B1 | * | 12/2004 | Lee et al. | 455/442 |
| 2001/0030953 | A1 | * | 10/2001 | Chang | 370/331 |
| 2001/0038615 | A1 | * | 11/2001 | Chang | 370/329 |
| 2001/0050907 | A1 | * | 12/2001 | Madour et al. | 370/329 |
| 2002/0021681 | A1 | * | 2/2002  | Madour | 370/331 |
| 2002/0048266 | A1 | * | 4/2002  | Choi et al. | 370/331 |
| 2002/0055364 | A1 | * | 5/2002  | Wang et al. | 455/466 |
| 2002/0067707 | A1 | * | 6/2002  | Morales et al. | 370/331 |

(Continued)

FOREIGN PATENT DOCUMENTS

WO  WO 99/07174  * 2/1999 ............ H04Q 7/38

OTHER PUBLICATIONS

Hiller, et al.; Comparisons of Low interruption Deferred Handoff Approaches; Lucent Technologies, Dec. 2000., p. 1-7.
Madour; Fast-handoff of Mobile IP . . . ; Ericsson, Sep. 2000 p. 1-15.
Bhalla; Fast-handoff in cdma2000 Wireless . . . ; cisco Systems, Feb. 2001, p. 1-31.

*Primary Examiner*—Rafael Perez-Gutierrez
(74) *Attorney, Agent, or Firm*—Mayer, Brown, Rowe & Maw LLP

(57) ABSTRACT

There is provided a method for performing an intra-packet data service node (PDSN) soft handoff. The method is implemented by setting up a channel passing through a target base station controller (T-BSC), a source base station controller (S-BSC) and a PDSN by establishing a direct channel link between the S-BSC and the T-BSC in an active packet session mode, performing a handoff between the S-BSC, the T-BSC and a mobile station (MS), transmitting or receiving user packet data exchanged between the MS, and the S-BSC and the T-BSC to or from the PDSN through the established channel link and sending or receiving user packet data exchanged between the MS and the T-BSC to or from the PDSN through the established channel link when the handoff is completed.

4 Claims, 4 Drawing Sheets

U.S. PATENT DOCUMENTS

| | | |
|---|---|---|
| 2002/0193110 A1 * | 12/2002 | Julka et al. .................. 455/432 |
| 2002/0193113 A1 * | 12/2002 | Sayeedi et al. ............. 455/439 |
| 2002/0196749 A1 * | 12/2002 | Eyuboglu et al. ........... 370/328 |
| 2003/0053430 A1 * | 3/2003 | Choi et al. .................. 370/331 |
| 2003/0053431 A1 * | 3/2003 | Madour ....................... 370/331 |
| 2003/0054823 A1 * | 3/2003 | Choi et al. .................. 455/436 |
| 2003/0054824 A1 * | 3/2003 | Choi et al. .................. 455/436 |
| 2004/0214574 A1 * | 10/2004 | Eyuboglu et al. ........... 455/439 |

* cited by examiner

METHOD FOR PERFORMING A FAST INTRA-PDSN SOFT HANDOFF

FIELD OF THE INVENTION

The present invention relates to synchronous IMT-2000 wireless packet communication networks; and, more particularly, to a method for performing a fast intra-packet data service node (PDSN) soft handoff, i.e., a soft handoff between packet control function units (PCFs) in the PDSN, without data loss to thereby provide high-speed/high-quality real-time data services without data loss in an active packet mode.

DESCRIPTION OF RELATED ART

In conjunction with current integrated Internet protocol (IP) networks, an Internet protocol based wireless packet data network is being standardized so as to provide Internet services and real-time VoIP services in a third generation synchronous IMT-2000 wireless access network.

In particular, since there are technical problems of header compression and a handoff to implement the current Internet protocol based wireless packet network, these problems should be overcome to obtain satisfactory QoS.

According to a standardization document IS-835 related to the third generation synchronous IMT-2000 wireless packet data network, which was completed at 3GPP2 TSG-P, as components constructing the wireless packet data network, there are a base station controller (BSC), a packet control function (PCF) unit, a packet data service node (PDSN), a mobile Internet protocol (IP) home agent (HA), an authentication/authorization/accounting (AAA) unit and so on.

Referring to FIG. 1, there is illustrated a call-processing flow diagram showing an intra-PDSN handoff procedure defined in the IS-835 and IOS V4.x.

If a message showing that a signal strength of a mobile station (MS) 101 became over a threshold of the signal strength defined in a network and, thus, another access network identifier (ANID) will be selected is transmitted from the MS 101 to a source-BSC (S-BSC) 103, the S-BSC 103 sends a Handoff Required message including a cell list within a domain of a target-BSC (T-BSC) 107 to an MSC 111 in step S101 and actuates a T7 timer. The Handoff Required message contains a previous ANID (PANID).

The MSC 111 selects the T-BSC 107 having an available wireless channel from the cell list, adds the PANID and a hard handoff indicator to a Handoff Request message and transmits the Handoff Request message to the T-BSC 107 in step S103. Herein, the hard handoff indicator means a handoff type component representing a hard handoff. By receiving the Handoff Request message, the T-BSC 107 allocates appropriate idle wireless resources and transmits null traffic channel data onto a forward traffic channel.

In step S105, the T-BSC 107 provides an A9-Setup-A8 message to a target-PCF (T-PCF) 109 to thereby set up an A8-Connection and actuates a TA8-Setup timer. Herein, the A8 is a user traffic path for BSC-PCF packet data services defined in the standardization document and the A9 represents a signal path for the BSC-PCF packet data services defined in the standardization document. Further, in step S105, a hard handoff indicator field in the A9-Setup-A8 message is set to 1.

After receiving the A9-Setup-A8 message, the T-PCF 109 sets up the A8-Connection, transmits an A9-Connect-A8 message to the T-BSC 107 and actuates a Twaitho9 timer in step S107. At this time, the T-BSC 107 and the T-PCF 109 cannot receive packet data from a PDSN 121 and the PDSN 121 continuously sends forward packet data to the S-BSC 103 through an S-PCF 105. Meanwhile, the T-BSC 107, which received the A9-Connect-A8 message, stops an operation of the TA8-Setup timer.

Since the hard handoff indicator field in the A9-Setup-A8 message was set to 1, an A10/A11 Connection is not established yet. The A10 and A11 represent traffic and signal paths for PCF-PDSN packet data services defined in the standardization document, respectively.

Then, in step S109, the T-BSC 107 allows the MS 101 to be tuned to a corresponding wireless channel by transmitting a Handoff Request Ack message including appropriate wireless channel information to the MSC 111 and actuates a T9 timer so as to wait for the signal receiving from the MS 101 through the corresponding wireless channel.

The MSC 111 prepares a call switching from the S-BSC 103 to the T-BSC 107 and sends a Handoff Command message including the wireless channel information provided from the T-BSC 107 to the S-BSC 103 in step S111. After then, the S-BSC 103 terminates an operation of the T7 timer.

The S-PCF 105 receives an A9-Air Link (AL) Disconnected message from the S-BSC 103 and, then, stops packet data transmission to the S-BSC 103 in step S113. After transmitting the A9-AL Disconnected message, the S-BSC 103 actuates a Tald9 timer.

In step S115, the S-PCF 105 sends an A9-AL Disconnected Ack message to the S-BSC 103 and the S-BSC 103 terminates an operation of the Tald9 timer.

In step S117, the S-BSC 103 transmits a general handoff direction message (GHDM) or a universal handoff direction message (UHDM) to the MS 101 and actuates a Twaitho timer so as to allow the MS 101 to return to the S-BSC 103.

The MS 101 provides the S-BSC 103 with an MS Ack Order message as a response to the GHDM or UHDM in step S119.

In step S121, the S-BSC 103 transmits a Handoff Commenced message to the MSC 111 so as to notify that the MS 101 is instructed to move to a channel of the T-BSC 107 and actuates a T306 timer to wait for transmission of a Clear Command message from the MSC 111. The Handoff Commenced message is transmitted after an operation of the Twaitho timer is terminated.

If the MS 101 completes the hard handoff procedure by obtaining synchronization through the use of a reverse communication channel frame or preamble data, the MS 101 transmits a Handoff Completion message to the T-BSC 107 in step S123 and the T-BSC 107 which received the Handoff Completion message transmits a BSC Ack Order message to the MS 101 in step S125.

Further, in step S127, the T-BSC 107, which received the Handoff Completion message from the MS 101, provides the T-PCF 109 with an A9-AL Connected message including the PANID. The T-BSC 107 terminates an operation of the Twaitho9 timer and the T-PCF 109 actuates a Talc9 timer.

The T-PCF 109, which received the A9-AL Connected message, establishes an A10/A11 link and the PDSN 121 releases an A10/A11 link established with the S-PCF 105 in step S129.

Then, the T-PCF 109 transmits an A9-AL Connected Ack message to the T-BSC 107 as a response to the A9-AL Connected message and terminates an operation of the Talc9 timer in step S131.

After detecting that the MS 101 is connected to the T-BSC 107, the T-BSC 107 transmits a Handoff Complete message to the MSC 111 so as to notify that the hard handoff is successfully performed for the MS 101 and terminates an operation of the T9 timer in step S133.

In step S135, the MSC 111 sends a Clear Command message to the S-BSC 105. The S-BSC 105 terminates an operation of the T306 timer and the MSC 111 actuates a T315 timer.

The S-BSC 103 sends an A9-Release-A8 message to the S-PCF 105 to release the A8-Connection and actuates a Trel9 timer in step S137.

The S-PCF 105 releases the A8-Connection and sends an A9-Release-A8 Complete message to the S-BSC 103 in step S139. The S-BSC 103 terminates an operation of the Trel9 timer.

Finally, the S-BSC 103 transmits a Clear Complete message to the MSC 111 and completes the intra-PDSN hard handoff procedure in step S141.

As described above, according to the intra-PDSN hard handoff procedure of the prior art, during the steps S111 to S129 being performed, the data transmitted from the PDSN 121 cannot be delivered to users, i.e., the MS 101. Moreover, since an A8 and A10 connection time leads to a time delay.

Therefore, in order to prevent data loss due to the time delay, there need regular doses of buffers in a node. However, although there were prepared the buffers, in case a size of data stored in the buffers exceeds the capacity of the buffers, there inevitably occurs a severe problem of causing the data loss.

That is, there is a problem that the existing intra-PDSN hard handoff performing method employed in the third generation synchronous IMT-2000 packet data network is improper to processing the packet data requiring fast transmission without data loss, i.e., real-time services.

Specifically, since the hard handoff performing method defined in the third generation synchronous IMT-2000 wireless packet network cannot provide fast and seamless real-time services since there is the time delay when the handoff is performed in the active mode, it is difficult to provide real-time audio/video packet data services such as VoIP.

SUMMARY OF THE INVENTION

It is, therefore, a primary object of the present invention to provide an intra-PDSN handoff performing method capable of providing seamless packet data services by substituting a soft handoff for a hard handoff from an S-BSC to a T-BSC and performing the soft handoff, providing packet data services in an active mode by maintaining the S-BSC as an anchor and establishing a link of a packet access network in a dormant mode, so that a time delay occurring at an active mode handoff performing process is reduced and packet data loss is prevented.

In accordance with the present invention, there is provided a method for performing an intra-packet data service node (PDSN) soft handoff, comprising the steps of: setting up a channel passing through a target base station controller (T-BSC), a source base station controller (S-BSC) and a PDSN by establishing a direct channel link between the S-BSC and the T-BSC in an active packet session mode; performing a handoff between the S-BSC, the T-BSC and a mobile station (MS); transmitting or receiving user packet data exchanged between the MS, and the S-BSC and the T-BSC to or from the PDSN through the established channel link; and sending or receiving user packet data exchanged between the MS and the T-BSC to or from the PDSN through the established channel link when the handoff is completed.

In accordance with the present invention, it is possible to perform a packet handoff without packet data loss by reducing a time delay caused in a handoff procedure performed during a packet data session of an active mode at an intra-PDSN.

In particular, since the S-BSC can continuously maintain a link with an S-PCF as an anchor by establishing an A3 Connection between the S-BSC and the T-BSC during a handoff procedure between the S-BSC and the T-BSC in the active mode, user packet data transmitted from the MS to the S-BSC and the T-BSC can be provided to a wireless packet data network through the S-BSC.

Furthermore, when the inventive handoff procedure is completed, by establishing a link between the T-BSC, a T-PCF and the PDSN after the active mode is converted to a dormant mode, it is possible to provide packet data services in a next active mode without data loss and a time delay due to the link establishment.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Figure 1:
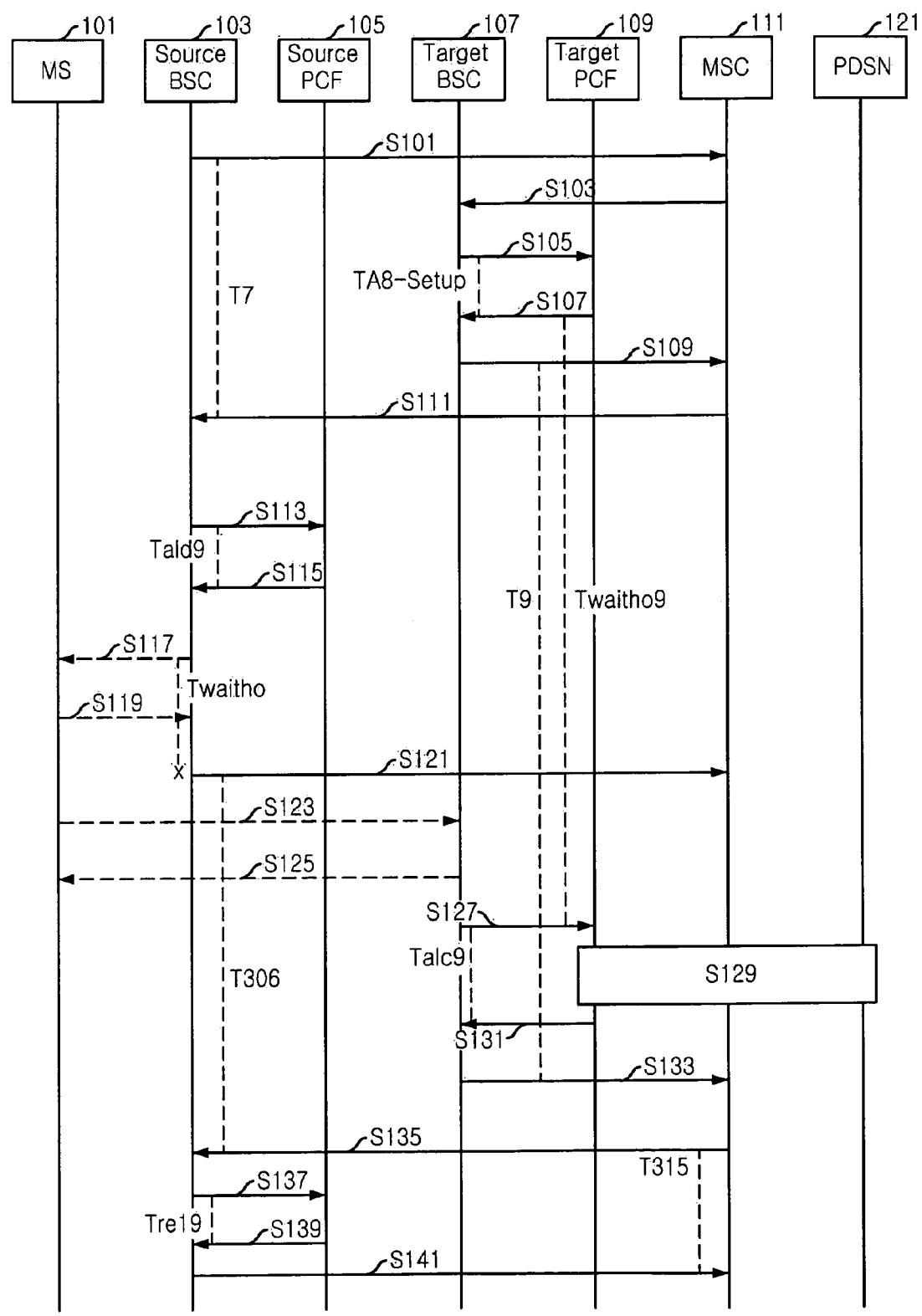
FIG. 1 provides a call-processing flow diagram showing an intra-PDSN handoff procedure defined in IS-835 and IOS V4.x.

Hereinafter, with reference to the accompanying drawings, some preferred embodiments of the present invention would be explained in detail. When assigning reference numerals to components constructing each drawing, same components are represented by an identical reference numeral although they are shown in different drawings.

Figure 2:
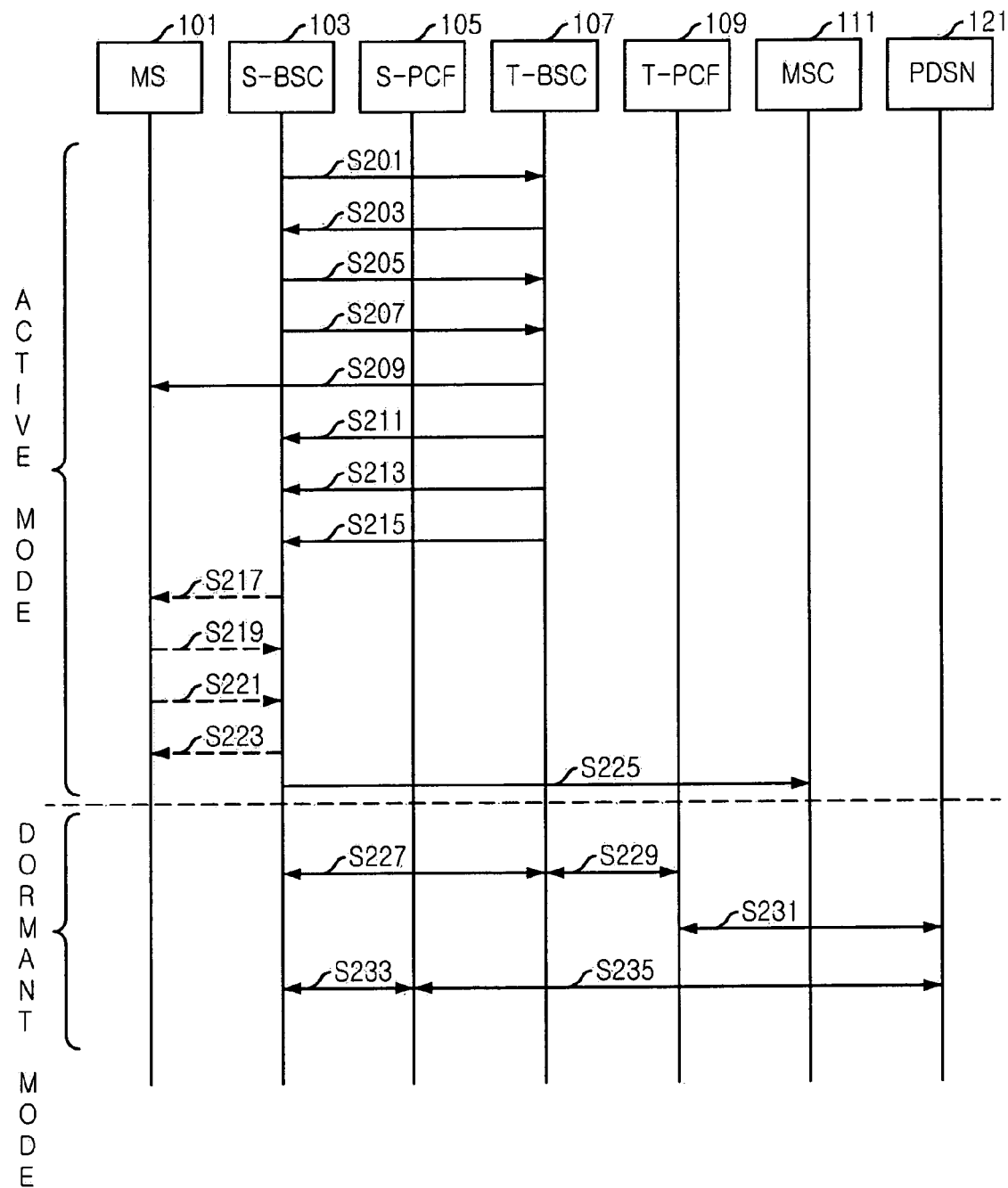
FIG. 2 describes a call-processing flow diagram representing an intra-PDSN soft handoff procedure in accordance with the present invention.

Referring to FIG. 2, there is shown a method for supporting an intra-PDSN soft handoff through a fast communication between BSCs without data loss in an active mode of a synchronous IMT-2000 wireless packet network in accordance with the present invention.

An inventive handoff procedure is a soft handoff scheme, which, in an active mode, utilizes a soft handoff procedure used in conventional circuit schemes in the wireless packet data network and, in a dormant mode, establishes an A8/A9/A10/A11 Connection between T-BSC 107, T-PCF 109 and PDSN 121 and, at the same time, releases the A8/A9/A10/A11 Connection between S-BSC 103, S-PCF 105 and PDSN 121. Therefore, the inventive handoff procedure can rapidly perform a handoff without a break and data loss.

As described in FIG. 2, the S-BSC 103 determines that at least one cell in the T-BSC 107 supports a call through a soft/softer handoff, and, then, transmits a A7-Handoff Request message to the T-BSC 107 in step S201. Herein, the A7 is an interface defined in a standardization document and is established for the soft/softer handoff between the S-BSC 103 and the T-BSC 107. Signaling information is exchanged between the S-BSC 103 and the T-BSC 107 through the A7 interface.

In step S203, the T-BSC 107, which received the A7-Handoff Request message, initializes an A3 Connection by transmitting an A3-Connect message to a prescribed address and a multiple A3 Connection is maintained in the soft handoff procedure in accordance with the present invention. The A3 is an interface defined in the standardization document and is established for the soft/softer handoff between the S-BSC 103 and the T-BSC 107. The A3 consists of two parts, i.e., a signaling signal and a user traffic, through which encoded user information (voice/data) and signaling information are exchanged. The signaling information is transmitted though a channel logically separated with a user traffic channel and controls a channel allocation and use for the transmission of user traffic information.

The S-BSC 103 sends an A3 Connect Ack message to the T-BSC 107 so as to complete the A3 Connection and responds to the A7-Handoff Request message in step S205.

Then, the S-BSC 103 transmits an idle forward frame to the T-BSC 107 in step S207 and the T-BSC 107 sends the idle forward frame to the MS 101 as soon as acquiring synchronization in order to prepare to transmit an idle reverse frame in step S209.

In step S211, the T-BSC 107 transmits the idle reverse frame to the S-BSC 103 as soon as receiving the idle forward frame from the S-BSC 103.

In a voice communication handoff procedure, the idle reverse frame includes time adjusting information required in acquiring the synchronization. However, in step S211, there is no need to include the time adjusting information for adjusting the synchronization because of the packet data.

Then, in step S213, the T-BSC 107 transmits an A7-Handoff Request Ack message to the S-BSC 103 to notify that a cell addition is successfully completed.

In step S215, if the S-BSC 103 determines to get the start of a signal send/receive from the T-BSC 107 and acquires synchronization of an A3 traffic sub-channel with the T-BSC 107, the T-BSC 107 sends an A3 Traffic Channel Status message to the S-BSC 103.

If the S-BSC 103 transmits a Handoff Direction message to the MS 101 and adds a new cell to an active set in step S217, the MS 101 responds to the Handoff Direction message by sending an MS Ack Order message to the S-BSC 103 in step S219 and notifies a successful result of processing the Handoff Direction message by transmitting a Handoff Completion message to the S-BSC 103 in step S221.

The S-BSC 103 sends a BS Ack Order message to the MS 101 as a response to the Handoff Completion message in step S223 and transmits a Handoff Performed message to the MSC 111 in step S225. Herein, the completion of the handoff procedure should be notified to the T-BSC 107.

In accordance with the present invention, although the handoff is performed in the active mode, the A8/A9 Connection is not established between the T-BSC 107 and the T-PCF 109 and the A8/A9 Connection is set up in a dormant mode as described herein below.

Figure 3:
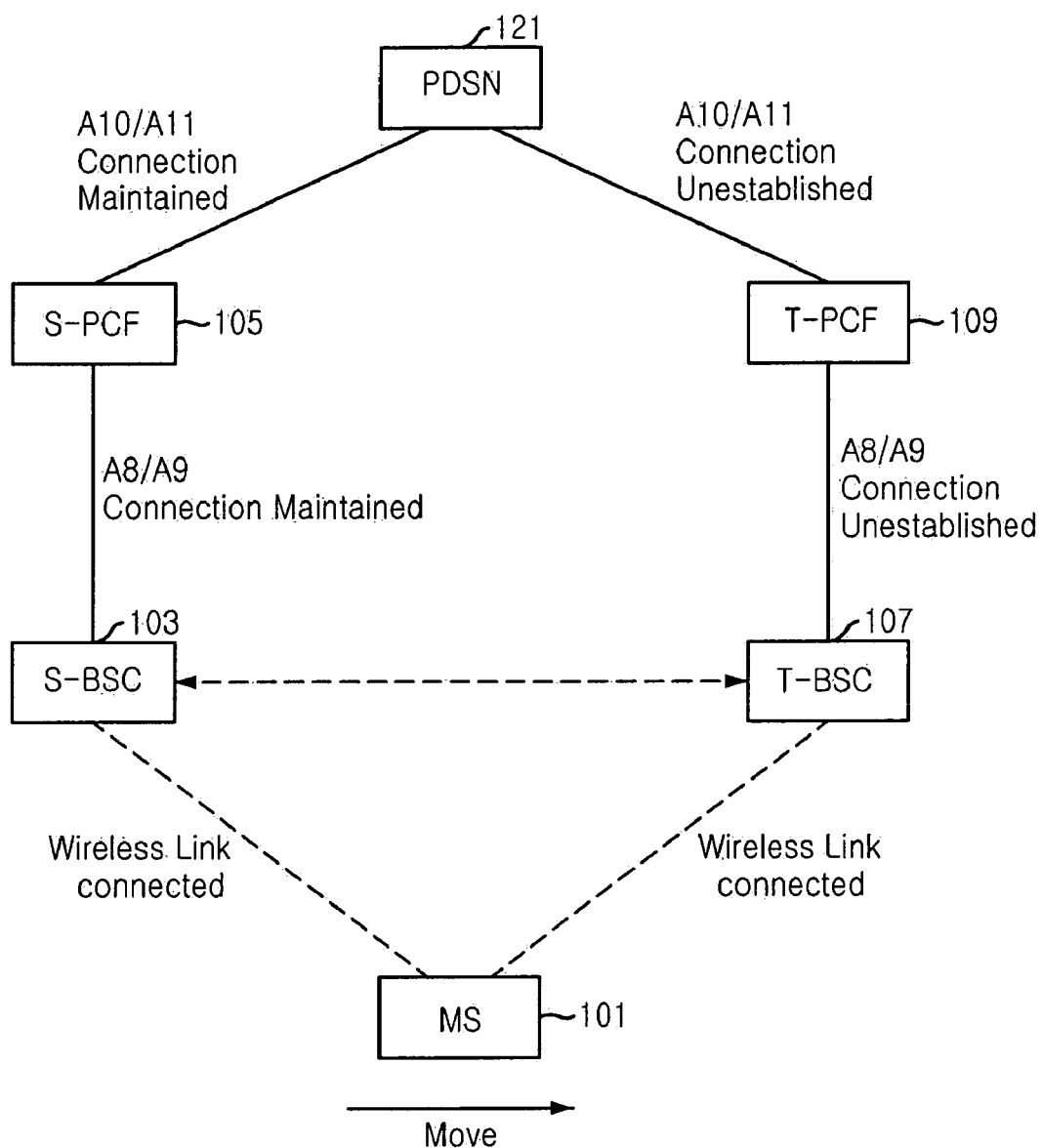
FIG. 3 is a conceptual diagram depicting a link established between BSCs when performing an intra-PDSN soft handoff in an active mode in accordance with the present invention.
Figure 4:
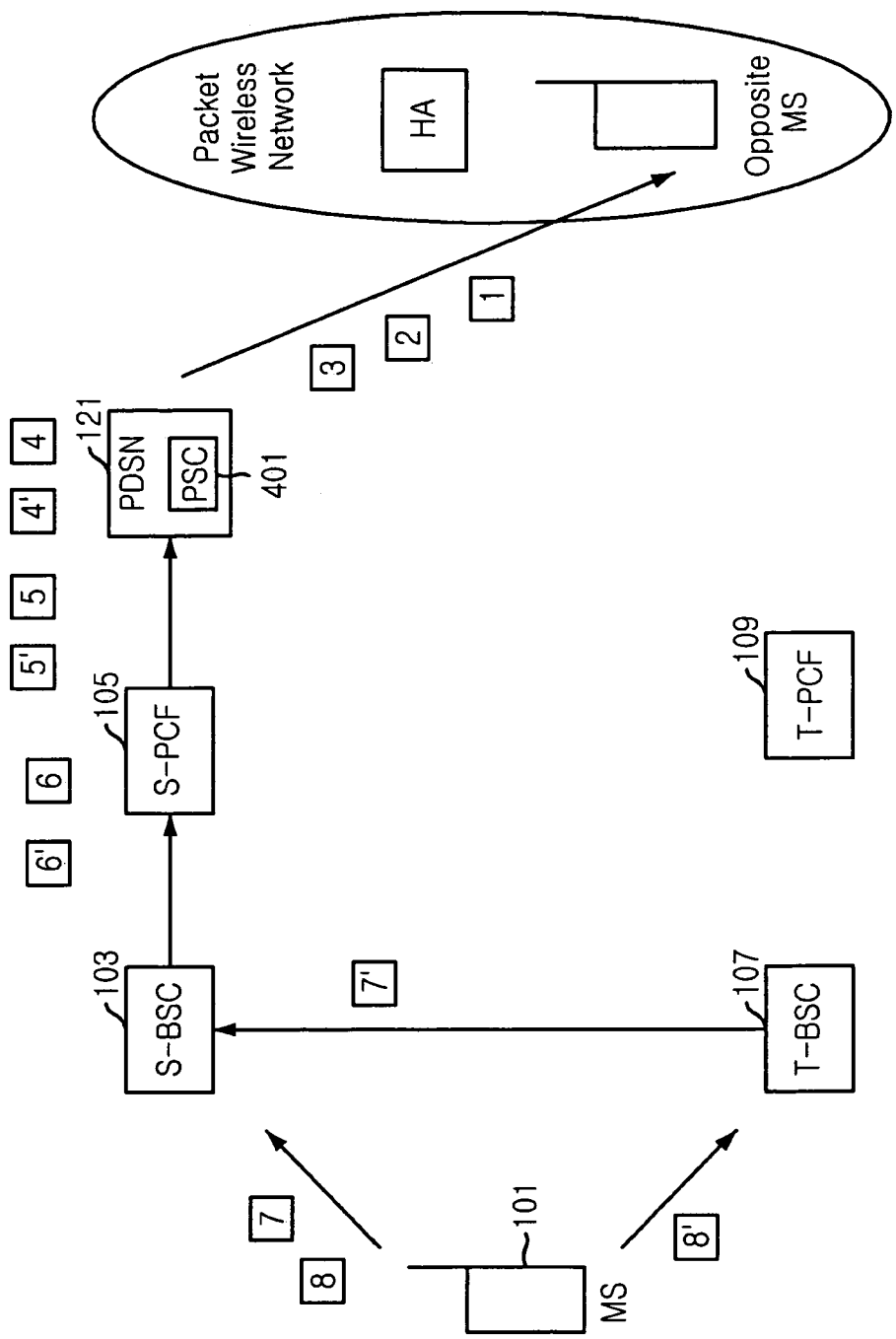
FIG. 4 illustrates a conceptual diagram showing a flow of packet data transmitted through a link established between an S-BSC and a T-BSC when performing an intra-PDSN soft handoff in an active mode in accordance with the present invention.

Referring to FIG. 3, there is shown a conceptual diagram depicting a link established between BSCs when performing the intra-PDSN soft handoff in the active mode in accordance with the present invention. FIG. 4 illustrates a conceptual diagram showing a flow of packet data transmitted through a link established between the S-BSC and the T-BSC when performing the intra-PDSN soft handoff in the active mode in accordance with the present invention.

As described in FIG. 3, as the MS 101 moves to the T-BSC 107, if the S-BSC 103 measures a power strength of a received wireless signal and determines the soft handoff, the A3 Connection is set up between BSCs and, at this time, packet data exchanged with the MS 101 during a soft handoff duration in the active mode pass through the S-BSC 103 and the T-BSC 107 at the same time.

In the meantime, the packet data passing through the T-BSC 107 are delivered to the S-BSC 103 and, as an anchor, the S-BSC 103 communicates with an opposite node of the packet wireless network through the S-PCF 105 and the PDSN 121. Likewise, packet data transmitted from the opposite node to the MS 101 are transferred in an order of the PDSN 121, the S-PCF 105, the S-BSC 103, the MSC 111 and the T-BSC 107 in step S223.

Therefore, since the S-BSC 103 plays a role of the anchor, there is no need to re-establish the A8/A9 Connection between the T-BSC 107 and the T-PCF 109 and the A10/A11 Connection between the T-PCF 109 and the PDSN 121, respectively.

Through the above process, it is possible to prevent the time delay caused in establishing a link in the conventional handoff scheme. Also, since data are delivered to the S-BSC 103 and the T-BSC 107 at the same time, the performance deterioration happening at a boundary of mobile communication cells can be precluded like a maximal ratio combining effect of a wireless signal.

After the soft handoff is completed, the user packet data transmitted from the MS 101 are delivered to the S-BSC 103 via the T-BSC 107. At this time, the S-BSC 103 exists as the anchor and, thus, continuously transmits packet data to the opposite node of the wireless packet data network through the S-PCF 105 and the PDSN 121 until the active mode is converted to the dormant mode. Likewise, packet data transmitted from the opposite node to the MS 101 are conveyed in an order of the PDSN 121, the S-PCF 105, the S-BSC 103, the MSC 111 and the T-BSC 107.

Referring to FIG. 4, there is shown a reverse flow diagram of packet data in the active mode soft handoff through the communication between BSCs in accordance with the present invention. In FIG. 4, the reference numerals 1 to 8 and 4' to 8' represent a flow of packet data in the handoff procedure. That is to say, the reference numerals 4 to 8 show packet data passing through the S-BSC 103 from the MS 101 and the reference numerals 4' to 8' present packet data passing through the T-BSC 107 from the MS 101. Further, the reference numerals 1 to 3 depict a flow of packet data selected by a packet sequence controller (PSC) 401 among the packet data passing through the S-BSC 103 and the T-BSC 107.

As illustrated in FIG. 4, during the active mode handoff duration, the packet data 4 to 8 and 4' to 8', which are transmitted from the MS 101 and pass through the S-BSC 103 and the T-BSC 107, are transmitted from the S-BSC 103 being the anchor to the S-PCF 105. That is, the S-PCF 105 sends two same packets to the PDSN 121 during the handoff duration.

At this time, the PDSN 121 stores the two packets in a buffer, decodes the stored packets and selects one of the two packets. The selection is achieved by the PSC 401 and the selected packet is encoded again and transmitted to the opposite node of the packet wireless network.

Consequently, the packet data 1 to 3 described in FIG. 4 represent the packet data that are passed through the S-BSC 103 and the T-BSC 107 and selected by the PSC 401.

After all, as depicted in FIGS. 2 to 4, by performing the above procedure in accordance with the present invention, since there was already established a channel link between the S-BSC 103 and the T-BSC 107 by the A3 Connection and the S-BSC 103 was determined as the anchor although the intra-PDSN handoff is executed in the active mode, it is possible to transmit the packet data to the wireless packet data network through the S-PCF 105 and the PDSN 121 by the channel link to the S-BSC 103 even though packet data are exchanged through a wireless link established between the MS 101 and the T-BSC 107 by the handoff.

Therefore, since the process for establishing the A8/A9/A10/A11 Connection between the T-BSC 107, the T-PCF 109 and the PDSN 121 is omitted, the time delay due to the hard handoff is substantially reduced and, thus, it is possible to provide seamless fast packet data services.

The process for setting up the A8/A9/A10/A11 Connection between the T-BSC 107, the T-PCF 109 and the PDSN 121 is performed in the dormant mode described herein below.

As shown in FIG. 2, after the T-BSC 107 detects that there is no packet data provided from the MS 101 or the S-BSC 103 anymore, the active mode is converted to the dormant mode. Then, in order to set up the A8-Connection with the T-PCF 109, an A9-Setup-A8 message is transmitted to the T-PCF 109 and the T-PCF 109, which received the A9-Setup-A8 message, establishes the A8-Connection and, then, sends an A9-Connect-A8 message to the T-BSC 107 in step S229. Meanwhile, the S-BSC 103 releases the A3 Connection with the T-BSC 107 in step S227.

Furthermore, the A10/A11 Connection is set up between the T-PCF 109 and the PDSN 121 in step S231. As a result, the A8/A9/A10/A11 Connection is established between the MS 101, the T-BSC 107, the T-PCF 109 and the PDSN 121.

Then, in step S233, if the S-BSC 103 transmits an A9-Release-A8 message to the S-PCF 105 to release the A8-Connection with the S-PCF 105, the S-PCF 105 releases the A8-Connection and produces an A9-Release-A8 Complete message as a response thereto.

In step S235, there is released the A10 Connection between the S-PCF 105 and the PDSN 121 and the state is updated, so that the intra-PDSN handoff procedure is terminated.

The handoff procedure in accordance with the present invention can provide high-quality real-time services since it supports the same fast soft handoff in the packet wireless communication network like as in a line network. Therefore, it is possible to use real-time services such as voice communication, video transmission, etc., in the packet network.

This moves up the introduction of the packet wireless network capable of effectively using resources to thereby provide users with opportunities using the high-quality services at a low cost. Moreover, since the present invention supports the soft handoff, there is no packet data loss and, thus, the present invention may be required to process important packets in application fields such as electronic commercial transaction.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing an intra-packet data service node (PDSN) soft handoff, comprising the steps of:
    (a) setting up a channel passing through a target base station controller (T-BSC), a source base station controller (S-BSC) and a PDSN by establishing a direct channel link between the S-BSC and the T-BSC in an active packet session mode;
    (b) performing a handoff between the S-BSC and the T-BSC without using a mobile switching center (MSC);
    (c) transmitting or receiving user packet data exchanged between a mobile station (MS), the S-BSC and the T-BSC to or from the PDSN through the established channel link; and
    (d) sending or receiving user packet data exchanged between the MS and the T-BSC to or from the PDSN through the established channel link when the handoff is completed.

2. The method as recited in claim 1 further comprising the steps of:
    (e) establishing a channel link between the T-BSC, a target packet control function (T-PCF) and the PDSN in a dormant packet session mode;
    (f) releasing the channel link set up between the S-BSC, a source packet control function (S_PCF), and the PDSN;
    (g) releasing the channel link established between the S-BSC and the T-BSC, which is established in the step (a).

3. The method as recited in claim 1, wherein, in the step (c), one of packet data transmitted from the MS to the PSDN through the S-BSC and the T-BSC is selected and transmitted to a wireless packet data service network.

4. The method as recited in claim 1, wherein the channel link established between the S-BSC and the T-BSC is an A3 channel link set up by transmitting an A7 Handoff Request message from the S-BSC to the T-BSC.

* * * * *